United States Patent [19]

Tsuruoka et al.

[11] Patent Number: 4,815,195

[45] Date of Patent: Mar. 28, 1989

[54] METHOD OF COMBINING PLURALITY OF PARTS AND STRUCTURE OF PLURALITY OF PARTS COMBINED BY SAME

[75] Inventors: Kazuhiro Tsuruoka; Hisanobu Kanamaru; Takefumi Ohwada; Isao Hayase; Masao Mizukami, all of Katsuta, Japan

[73] Assignee: Hitachi, Ltd., Tokyo, Japan

[21] Appl. No.: 904,103

[22] Filed: Sep. 4, 1986

Related U.S. Application Data

[63] Continuation of Ser. No. 616,297, Jun. 1, 1984, abandoned.

[30] Foreign Application Priority Data

Jun. 3, 1983 [JP] Japan .................................. 58-97843

[51] Int. Cl.⁴ .............................................. B21D 29/00
[52] U.S. Cl. .......................................... 29/523; 29/467
[58] Field of Search ........................ 411/43, 44, 57, 60, 411/69, 70, 500, 501; 29/523, 467

[56] References Cited

U.S. PATENT DOCUMENTS

| | | | |
|---|---|---|---|
| 2,146,461 | 2/1939 | Bettington | 411/44 |
| 2,181,103 | 11/1939 | Davis | 411/44 |
| 2,931,532 | 4/1960 | Gapp | 411/44 |
| 3,076,668 | 2/1963 | Famely | 411/44 |
| 3,702,088 | 11/1972 | Schmitt | 411/44 |
| 3,820,297 | 6/1974 | Hurd | 411/44 |
| 3,875,649 | 4/1975 | King | 411/69 |
| 4,003,288 | 1/1977 | Jeal | 411/70 |
| 4,597,365 | 7/1986 | Madaffer | 29/467 X |

*Primary Examiner*—Carl E. Hall
*Assistant Examiner*—Taylor J. Ross
*Attorney, Agent, or Firm*—Antonelli, Terry & Wands

[57] ABSTRACT

A method of combining a plurality of parts and a structure of a plurality of parts combined by the method, wherein each of the plurality of parts are provided with connecting bores in opposed portions thereof, the plurality of parts are put together in a piled state and a connecting tube is inserted into the connecting bores. An expanding punch is provided for subsequently expanding the connecting tube thereby combining or connecting members to each other.

9 Claims, 2 Drawing Sheets

METHOD OF COMBINING PLURALITY OF PARTS AND STRUCTURE OF PLURALITY OF PARTS COMBINED BY SAME

This is a continuation of application Ser. No. 616,297, filed June 1, 1984, now abandoned.

BACKGROUND OF THE INVENTION

This invention relates to a method of combining a plurality of parts and the structure of a plurality of parts combined by the method, and, more particularly, to a method of combining a plurality of parts, which is suitably used to secure an accurate positional relationship between parts combined, and the structure of a plurality of parts combined by the same.

DESCRIPTION OF THE PRIOR ART

In, for example, Japanese Patent Publication No. 6302/1978 a method of combining a plurality of parts by tubular rivets is proposed wherein the bores made in parts to be combined together must be limited to through bores. In addition, the length of a constant diameter portion of a head of a mandrel is substantially equal to the diameter of a rivet-driving bore. Therefore, if bores in bore-carrying parts are shifted even slightly from each other, one of or both of the bore-carrying parts are displaced by the radial force caused, by the side face of the constant diameter portion thereof, and in accordance with the movement of, the mandrel so as to align with each other. in the relative positional relationship between the bore-carrying parts.

SUMMARY OF THE INVENTION

A method of combining a plurality of parts, which is suitably used to highly accurately secure the relative positional relationship between parts to be combined, and the structure of a plurality of parts combined by the the method.

In accordance with the present invention, a method is proposed which includes the steps of putting together in a piled state a plurality of parts having connecting bores in opposed portions thereof, inserting a connecting tube into the connecting bores, and then expanding the connecting tube.

In accordance with further features of the present invention a combined structure of a plurality of parts is provided which includes a first member having a first connecting bore, a second member having a second connecting bore, and a connecting member inserted into the first and second connecting bores at once and expanded therein to combine the first and second members together.

A preferred embodiment of the present invention provides a method of combining a plurality of parts, with the method comprising the steps of arranging members to be combined, in which connecting bores are formed in advance, in a piled state in such a manner that the connecting bores are aligned with each other, substantially fixing these members with the relative positions thereof kept properly, inserting a connecting member into the connecting bores in the resultant members to be combined, and expanding the connecting member along the inner surfaces of the connecting bores to combine the fixed members together.

The above and other objects as well as advantageous features of the invention will become apparent from the following description of the preferred embodiment taken in conjunction with the accompanying drawings.

DETAILED DESCRIPTION

The accompanying drawings show an example of a rotary compressor to which a method of combining a plurality of parts according to the present invention is applied.

Figure 1:
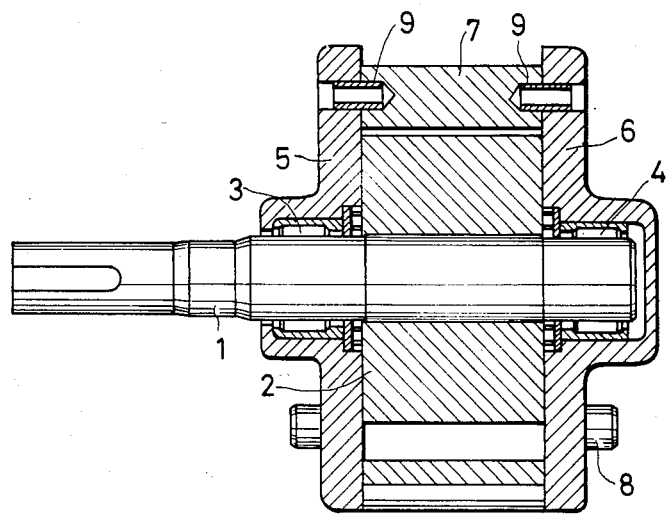
FIG. 1 is a front elevational view partially cross-sectional view of a rotary compressor to which the present invention is applied.
Figure 2:
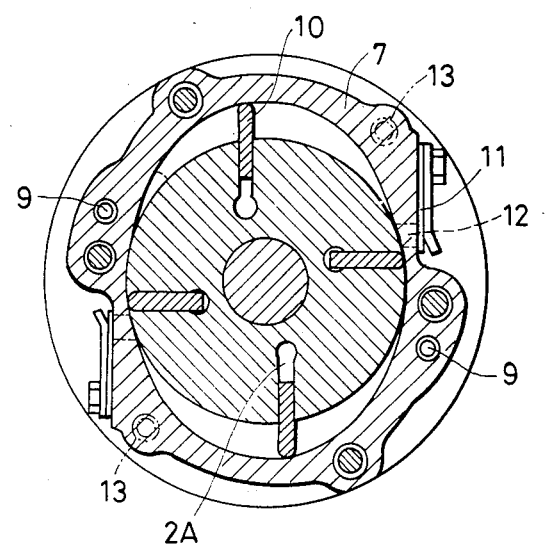
FIG. 2 is a side elevational view partially cross-sectional view of the rotary compressor of FIG. 1.

Referring now to the drawings, and, more particularly, to FIG. 1, according to this figure, a rotary compressor includes a shaft 1, adapted to be driven by the external driving force, with the shaft 1 being combined unitarily with a rotor 2 fitted therearound. The shaft 1 is supported at its end portions on the central portions of first and second bushings 5, 6, i.e. parts to be combined, via bearings 3, 4. A cam ring 7, representing another part to be combined is disposed on an outer circumferential surface of the rotor 2 and between the first and second bushings 5, 6, with the cam ring 7 being tightened and fixed to the bushings 5, 6 in the axial direction with a plurality of through bolts 8. In the meantime, the accuracy in the relative positional relation between the first bushing 5 and cam ring 7, and the second bushing 6 and cam ring 7 is secured, as will be described in detail later, by connecting tubes 9 inserted into connecting bores, which connecting tubes 9 are formed of an easily deformable material such as, for example, copper. These three parts are screw-combined fixedly by through bolts inserted through all thereof.

The rotor 2 is provided with radially-opened slits 2A, in which vanes 10 are provided, which always slidingly contact an inner circumferential surface of the cam ring 7 while the rotor is turned. These vanes 10 divide the spaces on the inner side of the cam ring 7 into suction chambers and compression chambers. The portions of the cam ring 7 which correspond to maximum compression points in the compression chambers are provided with discharge ports 12 closed with valves 11 adapted to be opened at a predetermined pressure. Screw bores 13 are provided in side surfaces of the cam ring 7 and used for positioning the cam ring 7 with respect to the bushings 5, 6 and screw-fixing the latter to increase the surface contact pressure between these parts.

Figure 3:
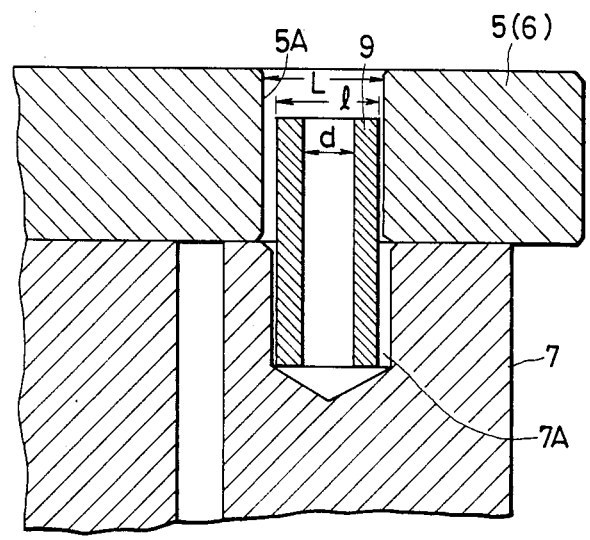
FIG. 3 is an enlarged detail view of a portion of the compressor of FIG. 1, showing a first step of the part-combining method according to the present invention.

A method of assembling the rotary compressor having the above-described construction will now be described. The shaft 1, on which the rotor 2 is fixedly premounted, is held in the first bushing 5 via the bearing 3. The cam ring 7 is fitted around the rotor 2, and the bushing 5 and cam ring 7 are screw-fixed to each other by utilizing the screw bores 13. The second bushing 6 is then fitted around the other end portion of the shaft 1 via the bearing 4 to be screw-fixed to the other side surface of the cam ring 7 by utilizing screw bores similar to those referred to above. In the resulting product, the cam ring 7 and bushings 5, 6 are combined firmly under a high surface pressure. A common connecting tube 9 is then inserted into a connecting through bore 5A and a connecting bottomed bore 7A in the bushing 5 and cam ring 7 so as to extend through all thereof as shown in FIG. 3. At least an outer diameter l of the connecting tube 9 is set smaller than a diameter L of a connecting bore. Accordingly, the connecting tube 9 can be inserted into the upper and lower connecting bores 5A, 7A smoothly even when these bores are slightly eccentric with respect to each other. As mentioned previously, the connecting tube 9 is formed preferably of an easily-deformable material, such as a copper material, an aluminum material, brass, or soft iron. The connecting tube 9 is expanded under pressure by a tube-expanding punch 15 having a ridge of a diameter D greater than an inner diameter d of the tube 9 and smaller than the diameter L of the connecting bores 5A, 7A, after the connecting tube 9 has been inserted into the connecting bores 5A, 7A.

Figure 4:
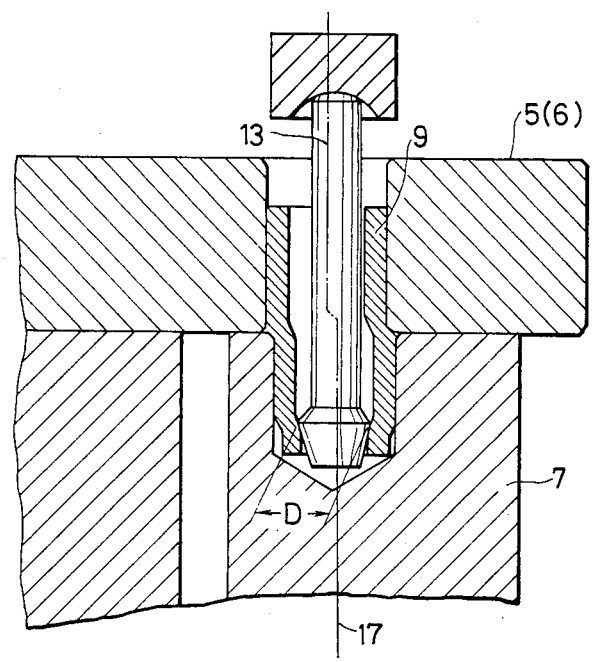
FIG. 4 is an enlarged detail view of the portion of FIG. 3 of the compressor, showing a second step of the method of the present invention.

FIG. 4 shows the condition of the expanded connecting tube. When the punch 15 is lowered, it moves linearly along an inner surfaces of the connecting bores 5A, 7A. Accordingly, the bushing 5 and cam ring 7 come into close contact with the connecting tube 9 as the former are moved unitarily to a slight extent in both the lateral and longitudinal directions relative to the connecting tube 9. The cam ring 7 and bushing 5 are provided with connecting bores independently in advance in such a manner that the connecting bores 5A, 7A are substantially aligned with each other when the cam ring 7 and bushing 5 are put together in a surface-contacting state. An amount of eccentricity of the cam ring 7 and bushing 5 is around 0–0.4 mm. Accordingly, the punch 15 can be lowered through the connecting tube 9, with the cam ring 7 and bushing 5 being moved unitarily and only slightly. The same effect can, of course, be obtained when the punch 15 is lowered as it is moved freely with the cam ring 7 and bushing 5 set in an immovable state.

When the lowered punch 15 reaches a bottom surface of the connecting bottomed bore 7A, the tube-expanding operation is completed. When the depth of the connecting bottomed bore 7A is selected suitably, a sufficient range of connection can be obtained. The diameter of the connecting bore may be set greater than a maximum diameter D of the punch to enable the punch to to be properly lowered therethrough. It is preferable that the diameter of the connecting bore, through which the punch is lowered, be set greater than the maximum diameter D of the punch and smaller than the outer diameter l of the connecting tube 9 so as to prevent the connecting tube 9 inserted in the connecting bore from falling. When the connecting bore is formed in this manner, the connecting tube is held firmly at its lower surface in spite of a downward load applied thereto during the lowering of the punch 15; the connecting tube does not fall.

The punch is substantially in the shape of a bead on an abacus, i.e. having a rhombus shape, and has a tube-expanding, circular ridge portion forming a maximum diameter portion D. Accordingly, when the punch 15 is inserted into the connecting tube 9, it is set in the substantially central position therein. When the punch 15 is further pressed down, the connecting tube 9 is expanded to closely contact the inner surface of the connecting bore as the connecting tube is plastically deformed. Even when the upper and lower connecting bores 6A, 7A are a little eccentric with respect to each other, the opposed surfaces of the connecting tube 9 and punch 15 can be brought into substantially linear contact with each other, so that the punch 15 can be moved relative to the connecting tube 9 smoothly and freely. The same effect can, of course, be obtained when the punch 15 is pulled out; the punch 15 can be pulled out smoothly. A spherical punch and a hemispherical punch can also be used effectively.

According to the above-described embodiment, when the relative positions of the cam ring 7 and bushings 5, 6 are determined first to fix these parts therein, the connecting tube 9 is necessarily deformed along the inner surfaces of the connecting bores to closely contact the same so that a bent axis portion 17 is formed when the cam ring 7 is eccentric to the bushings 5, 6. Namely, unlike the case where knock pins and screws are used, the fixed positions initially set do not vary. Therefore, the deformation strain does not occur in the cam ring 7 and bushings 5, 6. Also, these parts are not deformed due to the thermal cycle. Accordingly, the embodiment can display its performance stably as a rotary compressor.

The embodiment will now be discussed with respect to the assembling and manufacturing of a rotary compressor. Even when the connecting bores 6A, 7A made in the cam ring 7 and bushings 5, 6 are slightly eccentric with respect to each other, the accuracy in the relative positional relationship between these parts can be secured, so that the productivity of the rotary compressor is significantly increased. Moreover, it is unnecessary, during the assembling of these parts, to consider centering of the connecting bores 6A, 7A. This enables even an unexperienced person to easily assemble the parts. Also, the connecting tube can be inserted into and expanded in the connecting bores 6A, 7A blindly by a simple press work. Although the above embodiment has been described with reference to the combining of plates with an annular part, the invention can also be applied effectively to the fixing of plates in a laminated state; the combining of plates with an annular part and the combining of plates only do not substantially differ.

The cam ring 7 and bushings 5, 6 are combined preliminarily with screws. This preliminary combining work may be done by using pins or rivets. Any other combining means may be used provided that they enable the object parts to be kept in a substantially fixed state while the connecting tube 9 is inserted into and expanded in the connecting bores 6A, 7A. The cam ring 7 and bushings 5, 6 can also be maintained fixed in the same manner when a metal mold is used for this purpose. According to this part-combining method, it produces advantageous effect when applied to parts to be combined which are of an aluminum material, since they have a suitably high thermal expansion coefficient.

What we claim:

1. A method of combining a plurality of parts, the method comprising the steps of arranging a first member to be combined, which has a first connecting bore, and a second member to be combined, which has a second connecting bore the diameter of which is substantially the same as said first connecting bore, in such a manner that one of said members is piled on the other with said first and second connecting bores substantially aligned with each other, fixing said first and second members to maintain a relative position of said first and second members constant, inserting a connecting tube having substantially the same inner diameter over an entire length thereof into said first and second connecting bores in said first and second members to be combined, and expanding said connecting tube by forcibly inserting a tube expanding tool into said connecting tube in a longitudinal direction so that said connecting tube tightly contacts inner walls of said first and second connecting bores while allowing a relative lateral movement between said preliminary fixed first and second members and said tube-expanding tool around an abutment portion between said first and second members to thereby combine said first and second members together via said connecting tube.

2. A method of combining a plurality of parts, the method comprising the steps of:

arranging a first member to be combined, which has a first connecting bore and a first hole at a different position from said first connecting bore, and a second member to be combined, which has a second connecting bore, the diameter of which is substantially the same as said first connecting bore and a second hole having substantially the same diameter as said first hole and substantially the same relative position to said second connecting bore as the relative position of said first hole to said first connecting bore, in such a manner that one of said members is piled on the other, inserting a fastening member into said first and second holes and fixing said first and second members to maintain a relative position of said first and second members constant, inserting a connecting tube having substantially the same inner diameter over an entire length thereof and slightly smaller outer diameter than said first and second connecting bores into said first and second connecting bores in said first and second members to be combined and continuously expanding said connecting tube in both regions of said first and second members by forcibly inserting a tube expanding tool into said connecting tube in a longitudinal direction so that said connecting tube tightly contacts inner walls of said first and second connecting bores while allowing a relative lateral movement between said preliminary fixed first and second members and said tube-expanding tool around an abutment portion between said first and second members to thereby combine said first and second members together via said connecting tube.

3. A method of combining a plurality of parts, the method comprising the steps of arranging first and second members to be combined, in which first and second connecting bores are substantially the same in diameter as each other and formed in advance, in such a manner that said first and second members are piled with said first and second connecting bores substantially aligned with each other, preliminarily and substantially fixing said first and second members with the relative positions thereof maintained properly, inserting a connecting tube into said connecting bores in said first and second members, the outer diameter of said connecting tube being smaller than said connecting bores of said first and second members, and forcibly inserting a tube-expanding punch having an annular ridge such that a maximum diameter portion which is larger than the inside diameter of said connecting tube presents an annular line into said connecting tube while allowing a relative lateral movement between said first fixed and second members and said tube-expanding punch when said annular ridge of said punch passes around an abutment portion between said first and second members, so that said connecting tube is continuously expanded to tightly contact with inner surfaces of said first and second bores of said fixed first and second members and pulling out said tube expanding punch from said connecting tube.

4. The method of combining a plurality of parts according to claim 3, wherein the maximum diameter of said annular ridge in said tube-expanding punch is smaller than the outer diameter of and larger than the inner diameter of said connecting tube, said annular ridge has one of an rhombus-bead-like sectional shape and a hemispherical sectional shape.

5. The method of combining a plurality of parts according to claim 4, wherein said first and second members have portions to be accurately positioned which are different from said connecting bores, and said first and second members are arranged for said portions to be positioned accurately so that said alignment between said first and second connecting bores is attained as a result of said positioning.

6. A combined structure of a plurality of parts, comprising a first member having a first connecting bore; a second member having a second connecting bore and piled on said first member so that said first and second connecting bores are eccentrically disposed with respect to each other; a connecting tube inserted in said first and second connecting bores, and expanded to tightly contact with inner surfaces of said first and second connecting bores; and a bent axis portion of said connecting tube formed at a contacting portion of said first and second members according to the eccentricity between said first and second connecting bores.

7. Structure of a plurality of combined parts according to claim 6, wherein said first connecting bore is a through bore, said second connecting bore being a bottomed bore.

8. A method of combining a plurality of parts, the method comprising the steps of:

preparing first and second members to be combined;

forming at least two first holes in said first member and at least two second holes in said second member;

forming at least two first connecting bores in said first member and at least two second connecting bores in said second members, said at least two first connecting bores being substantially the same in diameter as said at least two second connecting bores, respectively, and a positional relationship betweens said second holes and said second connecting bores being substantially the same as positional relationship between said second holes and said second connecting bores;

superposing said first member on said second member and inserting fastening members into said first and second holes to fix said first and second members, so that said first connecting bores of said first members align substantially with said second connecting bores of said second member;

inserting connecting tubes into said aligned first and second connecting bores, respectively, said connecting tubes each having an outer diameter slightly smaller than the diameter of said first and second connecting bores and substantially the same inner diameter over a substantially entire length thereof;

selecting a tube-expanding tool having a ridge at one end portion thereof, said ridge having a diameter larger than said inner diameter of said connecting tube, the maximum diameter portion of said ridge being substantially one point with respect to the axial direction;

forcibly inserting said tube-expanding tool into said each connecting tube in a longitudinal direction and radially freely from first member side to expand said connecting tube in first and second member regions so that said connecting tube tightly contacts with the inner walls of said first and second members, even if there is small eccentricity between said first and second connecting members; and pulling out said tube-expanding tool from said expanded connecting tube.

9. The method of combining a plurality of parts according to claim 8, wherein said fastening members are bolts, and said first and second members are fixed by said bolts inserted in said first and second holes.

* * * * *